United States Patent [19]

Drnevich et al.

[11] 4,175,041
[45] Nov. 20, 1979

[54] APPARATUS FOR DEGASSING FLOATING SLUDGE

[75] Inventors: Raymond F. Drnevich, Clarence; Kallidaikurichi N. Venkataraman, Tonawanda; Thomas E. Walder, Newfane, all of N.Y.

[73] Assignee: Union Carbide Corporation, New York, N.Y.

[21] Appl. No.: 839,559

[22] Filed: Oct. 5, 1977

[51] Int. Cl.² .............................................. B01D 19/02
[52] U.S. Cl. ...................................... 210/188; 55/178; 55/201; 210/525; 210/530
[58] Field of Search ........................ 55/178, 199, 201; 210/188, 520, 525, 527–531

[56] References Cited

U.S. PATENT DOCUMENTS

| 2,184,195 | 12/1939 | Naucler | 55/178 X |
| 2,520,540 | 8/1950 | Green | 210/188 X |
| 2,610,155 | 9/1952 | Humfeld et al. | 55/178 |
| 3,017,951 | 1/1962 | Wiley | 210/188 X |
| 3,169,841 | 2/1965 | Weis | 55/199 X |
| 3,284,993 | 11/1966 | Sebald et al. | 210/527 X |
| 3,298,670 | 1/1967 | Crom | 210/525 X |
| 3,395,800 | 8/1968 | Kraus et al. | 210/525 X |
| 3,525,439 | 8/1970 | Spragins | 210/520 |

*Primary Examiner*—Robert H. Spitzer
*Attorney, Agent, or Firm*—Steven J. Hultquist

[57] ABSTRACT

Apparatus for degassing floating solids containing entrapped gas in an open-topped liquid-solid settling chamber wherein floating solids tend to accumulate at the surface of liquid being separated from solids. Liquid containing floating solids is gently agitated in a trough enclosure for degassing of same to form liquid containing degassed solids, and the latter is discharged from the trough disclosure into the liquid-solid settling chamber.

11 Claims, 8 Drawing Figures

APPARATUS FOR DEGASSING FLOATING SLUDGE

BACKGROUND OF THE INVENTION

1. Field of Invention

This invention relates to apparatus for degassing floating solids containing entrapped gas an open-topped liquid-solid settling chamber wherein floating solids tend to accumulate at the surface of liquid being separated from solids.

2. Description of the Prior Art

In the conventional activated sludge systems in use today, wastewater is subjected to the usual screening and pretreatment steps, e.g., primary sedimentation, then mixed with recycled activated sludge to form a mixed liquor (liquid-solid mixture) which is subjected to aeration with an oxygen-containing gas in an aeration zone. During aeration of the mixed liquid, the microorganisms present in the activated sludge cause the aerobic decomposition of solids and a high degree of BOD removal is achieved.

Phosphates, which are present in organic wastes and detergents, escape conventional wastewater treatment processes and are released with the effluent into natural water resources, e.g., lakes, rivers and streams. These phosphates result in over-fertilization or eutrophication of water causing unsightly algal blooms and serious pollution problems.

It is known that aeration of the mixed liquor in an activated sludge wastewater treatment process initially causes the microorganisms present to take up phosphate. U.S. Pat. No. 3,236,766 discloses a process which utilizes this phenomenom for removing phosphates from wastewater. According to the process disclosed in that patent, the pH of the raw wastewater is adjusted, if necessary, to maintain a range from about 6.2 to about 8.5, the wastewater is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge liquid-solid is treated to reduce the phosphate content thereof prior to recycling for mixing with the influent wastewater. This is accomplished by maintaining the phosphate-enriched sludge in an anaerobic condition for several hours in a combination phosphate stripper and sludge thickener vessel. In this vessel, the phosphate-enriched sludge is settled and thickened and the anaerobic conditions cause the microorganisms which took up phosphate in the aeration zone to release phosphates to the liquid phase to form a phosphate-enriched supernatant. The phosphate-enriched supernatent is delivered to a phosphate precipitator where a phosphate precipitating reagent such as lime is added to precipitate the soluble phosphates.

U.S. Pat. No. 4,042,493 discloses a specific improvement in the process of the aforedescribed U.S. Pat. No. 3,236,766. In accordance with the specific improvement features of the process described in the former patent, released phosphate is counter-currently stripped from the sludge in the stripping zone. Such improvement requires a sludge residence time in the stripping zone of from two to ten hours. A low phosphate, low solid stripping medium is introduced into the stripping zone lower section for upflow through at least part of the settling solids to the stripping zone upper section. In this manner the phosphate released from the settling sludge solids is transferred to the upflowing liquid to provide phosphate-enriched liquid in the stripping zone upper section. The stripping medium has a suspended solids content not exceeding 200 mg./liter and the volumetric flow rate of the stripping medium introduced into the stripping zone is maintained between 0.7 and 2.0 times the volumetric flow rate of the phosphate-enriched liquid withdrawn therefrom.

In the phosphate stripping chambers employed in the above-described processes, it has been found that floating sludge solids tend to accumulate at the surface of liquid being separated from sludge solids, due to the onset of nitrification in the sludge solids being treated. In the anaerobic stripping zone, nitrosomonas and nitrobacter bacteria develop under favorable conditions, convert the ammonia contained in the sludge solids to chemical species containing the nitrate radical and under the anaerobic conditions present other bacteria in the sludge solids will satisfy their oxygen requirement by reducing the nitrates thereby releasing free nitrogen. Such biochemical reactions thus result in the release of nitrogen in the biological solids in the phosphate stripping zone thereby causing flotation of sludge containing entrapped gas, with resulting carryover of sludge solids in the phosphate-enriched supernatant liquid withdrawn from the stripping zone. Such carryover of floating sludge solids is severely detrimental to process efficiency for several reasons. First, the floating sludge is unsightly and can cause objectionable odors. Secondly, the sludge also contains acid chemical species and, therefore, in the presence of such floating sludge solids, the chemical reagent requirement for phosphate precipitation from the supernatant liquid is correspondingly increased. Further, the chemically precipitated phosphate sludge, i.e., the phosphate precipitant precipitated from supernatant liquid withdrawn from the stripping zone, is often used as crop fertilizer, and when contaminated with floating bacterial sludge solids, it is less acceptable for such use. Finally, sludge solids carryover in the supernatant liquid withdrawn from the phosphate stripping zone represents a loss of biological sludge solids, with possible adverse effect on the phosphate removal capability of the overall process.

The problem of floating sludge solids in a sludge settling chamber is not limited to the phosphate stripping chambers in the processes just described. Nitrification of sludge can also be encountered in wastewater treatment activated sludge plants which practice extended aeration or otherwise provide favorable conditions for the growth of nitrosomonas and nitrobacter bacteria. The biochemical reduction of the nitrates which are inevitably formed in the presence of such bacteria and subsequent release of nitrogen gas can also occur in the oxygen-deficient conditions which can develop in the settled solids layer of the clarifier or sludge thickener of such wastewater treatment plants. In these cases, the resulting floating sludge solids problem can be at least partially overcome by increasing the underflow rate from the clarifier or thickener, thereby reducing the sludge retention time in the sludge blanket. This is due to the fact that for nitrification, i.e., conversion of ammonia to nitrates, to occur, biological sludge solids must be retained in the sludge for a significant period of time to sustain adequate population of the slow-growing nitrifying bacteria. Nonetheless, such increase in the underflow rate from the clarifier or settling chamber reduces the sludge thickening capability of the clarifier or thickener, with the attendant disadvantages that are associated with the reduced level of solids in the settled sludge underflow.

Accordingly, it is an object of the present invention to provide apparatus for degassing floating solids containing entrapped gas in an open-topped liquid-solid settling chamber wherein floating solids tend to accumulate at the surface of liquid being separated from solids.

Other objects and advantages of the present invention will be apparent from the ensuing disclosure and appended claims.

SUMMARY OF THE INVENTION

This invention relates to apparatus for degassing floating solids containing entrapped gas in an open-topped liquid-solid settling chamber wherein the floating solids tend to accumulate at the surface of liquid being separated from the solids. The liquid-solid settling chamber includes means for introducing liquid-solid to be separated to the chamber, means for withdrawing solids-depleted liquid from an upper section of the chamber and means for withdrawing settled solids from a lower section of the chamber.

The apparatus of the present invention includes an open-topped trough enclosure positioned such that the trough enclosure is partially submerged in the liquid in the liquid-solid settling chamber, having a first wall member terminating at an upper end below the surface of liquid in the liquid-solid settling chamber and a second wall member substantially parallelly aligned with respect to the first wall member and spaced therefrom, terminating at an upper end above the surface of liquid in the liquid-solid settling chamber, whereby liquid containing floating solids is flowed into the trough enclosure over the first wall member thereof. Mechanical means are provided for gently agitating the liquid containing floating solids in the trough enclosure for degassing of same, to form liquid containing degassed solids. Means are provided for discharging liquid containing degassed solids from the trough enclosure into the liquid-solid settling chamber.

As used herein, the term "liquid-solid" refers to a mixture of solids and liquid, as for example sludge from an activated sludge process formed by activated sludge solids suspended in an aqueous medium. By "gentle agitation of liquid containing floating solids" is meant agitation without substantial increase in the gas-liquid interfacial area of the liquid being agitated.

DESCRIPTION OF THE PREFERRED EMBODIMENTS

Figure 1:
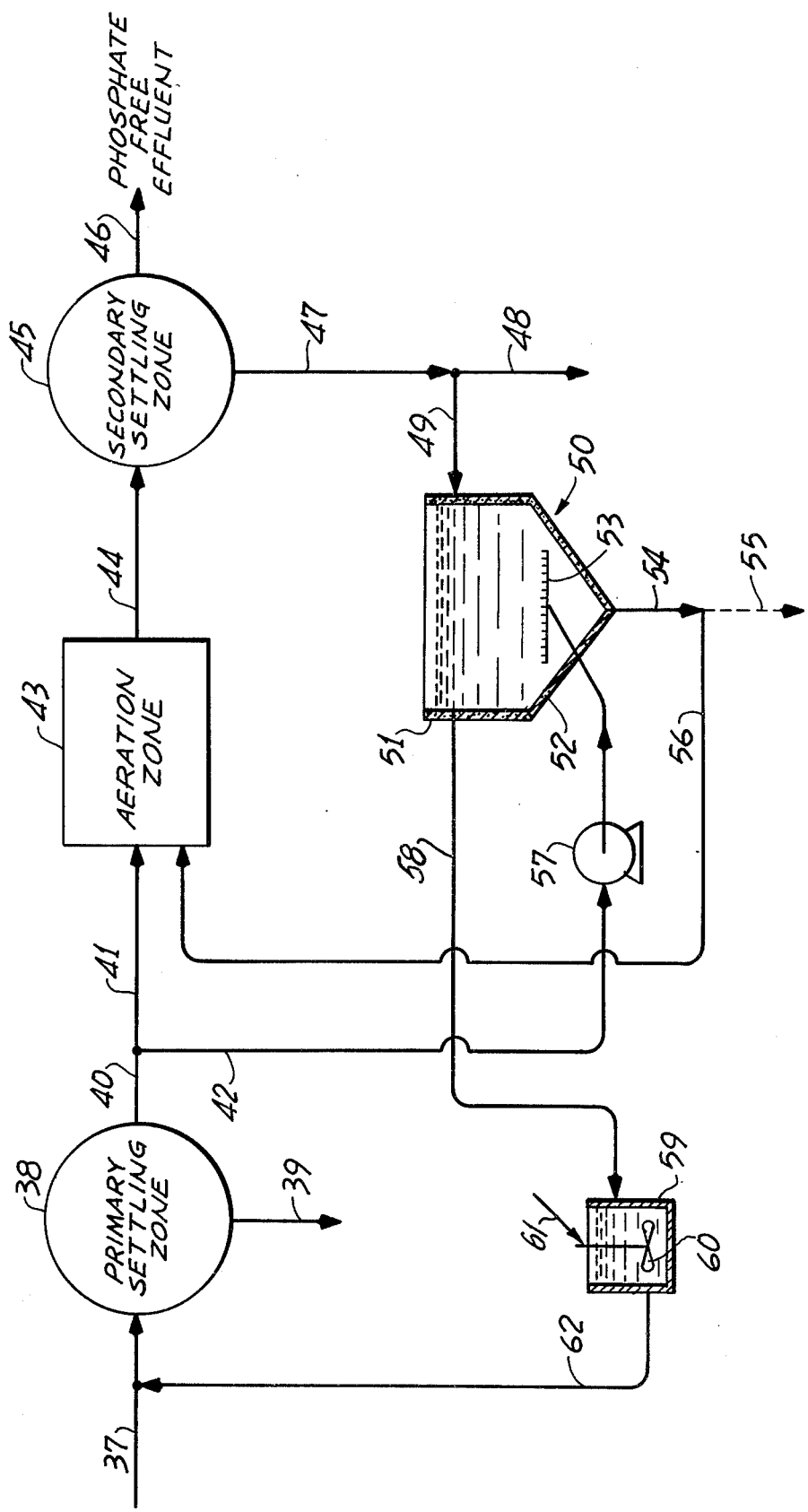
FIG. 1 is a schematic flow sheet of a wastewater treatment system wherein the apparatus of the present invention may suitably be employed.

Referring now to the drawings, FIG. 1 is a schematic flow sheet of an illustrative wastewater treatment system wherein the means of the present invention may be employed in the phosphate stripping zone thereof. In the FIG. 1 system, phosphate-containing raw sewage in line 37 is joined with a mixture of phosphate-depleted liquid and precipitated phosphate particles, to be described more fully hereinafter, from line 62 and the combined stream is introduced into the primary settling zone 38. In the primary settling zone, solids-liquid separation is effected to yield a solids-depleted primary effluent which is withdrawn from the settling zone in line 40 and settled solids which are withdrawn in line 39 as primary sludge and passed to waste or other further treatment and/or disposition steps. The withdrawn primary sludge in line 39 contains the precipitated phosphate which was added to the raw sewage in line 37 and which settles along with the other solids in the settling zone. Such an arrangement is particularly advantageous as regards the settling efficiency of the primary settling zone inasmuch as the presence of the precipitated phosphate improves the settling characteristics of the sludge therein.

A minor part of the primary effluent withdrawn from the settling zone 38 in line 40 is withdrawn therefrom in line 42 having pump means 57 disposed therein, and passed to the phosphate stripping zone 50 as a low phosphate, low solids stripping medium, being introduced into the stripping chamber lower section via the sparger means 53. The other major part of the primary effluent withdrawn from the primary settling zone is passed to the aeration zone 43 in line 41 as the influent wastewater therefor. In the aeration zone, the phosphate-containing influent wastewater introduced in line 41 is mixed with phosphate-lower activated sludge, introduced to the aeration zone by line 56, and oxygen-containing gas, and one of the liquid and oxygen gas fluids is circulated against the other fluid for sufficient duration to reduce the BOD content of the wastewater and cause the microorganisms in the activated sludge to take up phosphate to form an aerated mixed liquor containing phosphate-enriched sludge. The mixed liquor in the aeration zone may for example be aerated with two cubic feet of air per gallon of wastewater for six hours.

The aerated mixed liquor is then discharged from the aeration zone in line 44 and passed to the secondary settling zone 45, wherein the phosphate-enriched sludge is separated from the mixed liquor into substantially phosphate-free effluent, which is discharged from the system in line 46, and phosphate-enriched activated sludge, which is withdrawn from the bottom section of the settling zone in line 47. From the sludge stream in line 47, a portion of the sludge may intermittently be diverted in line 48 as secondary waste sludge and delivered to disposal and/or other end use facilities. The remainder of the sludge is passed to the phosphate stripping chamber 50 by line 49. In the stripping chamber, the introduced sludge is settled, and at least a major portion of the sludge is maintained under anaerobic conditions to release phosphate from the phosphate-enriched sludge. The aforementioned diverted portion of the primary effluent is introduced to the stripping chamber through sparger 53 at the stripping chamber lower section 52 for upflow through at least part of the settling solids to the stripping chamber upper section 51 whereby the phosphate released from the settling sludge solids is transferred to the upflowing liquid to provide a phosphate-enriched liquid in the stripping chamber upper section. The stripping chamber is operated to provide a sludge residence time of 2–10 hours. The diverted primary effluent stripping medium has a suspended solids concentration not exceeding 200 mg./liter. The volumentric flow rate of the primary effluent stripping medium is maintained between 0.7 and 2.0 times the volumetric flow rate of the phosphate-enriched liquid withdrawn from the stripping chamber in line 58.

The phosphate-lower sludge withdrawn from the lower section 52 of the stripping chamber in line 54 may be partially wasted through line 55. In this system, the waste sludge may be fully eliminated via line 55, in which case the previously described waste sludge line 48 may be deleted from the process system, or alternatively, both lines 48 and 55 may be employed for wasting of sludge. The remainder of the phosphate-lower sludge, i.e., the unwasted portion, is passed through line 56 to the aeration zone as the activated sludge therefor.

The phosphate-enriched liquid withdrawn from the stripping chamber upper section 51 in line 58 is flowed to the mixing and phosphate precipitation tank 59. In this tank, the liquid is rapidly mixed by means of agitation propeller 60 with a phosphate precipitant, such as aluminum or iron salts or lime, introduced to tank 59 in line 61, to precipitate phosphate in the phosphate-enriched supernatant liquor. In practice, lime is preferred because unlike reagents such as aluminum or iron salts which merely react stoichiometrically, lime provides an additional pH elevation effect which enhances the phosphate precipitation removal. The resultant mixture of precipitated phosphate and phosphate-depleted liquid is passed by line 62 for mixing with raw sewage in line 37 being flowed to the primary sedimentation zone 38.

In the typical operation of the sludge stripping chamber 50 in the process system of FIG. 1, it has been found that floating sludge tends to accumulate at the surface of liquid being separated from sludge solids. Such tendency is fully overcome by the apparatus of the present invention, whereby the floating sludge containing entrapped gas is degassed.

Figure 2:
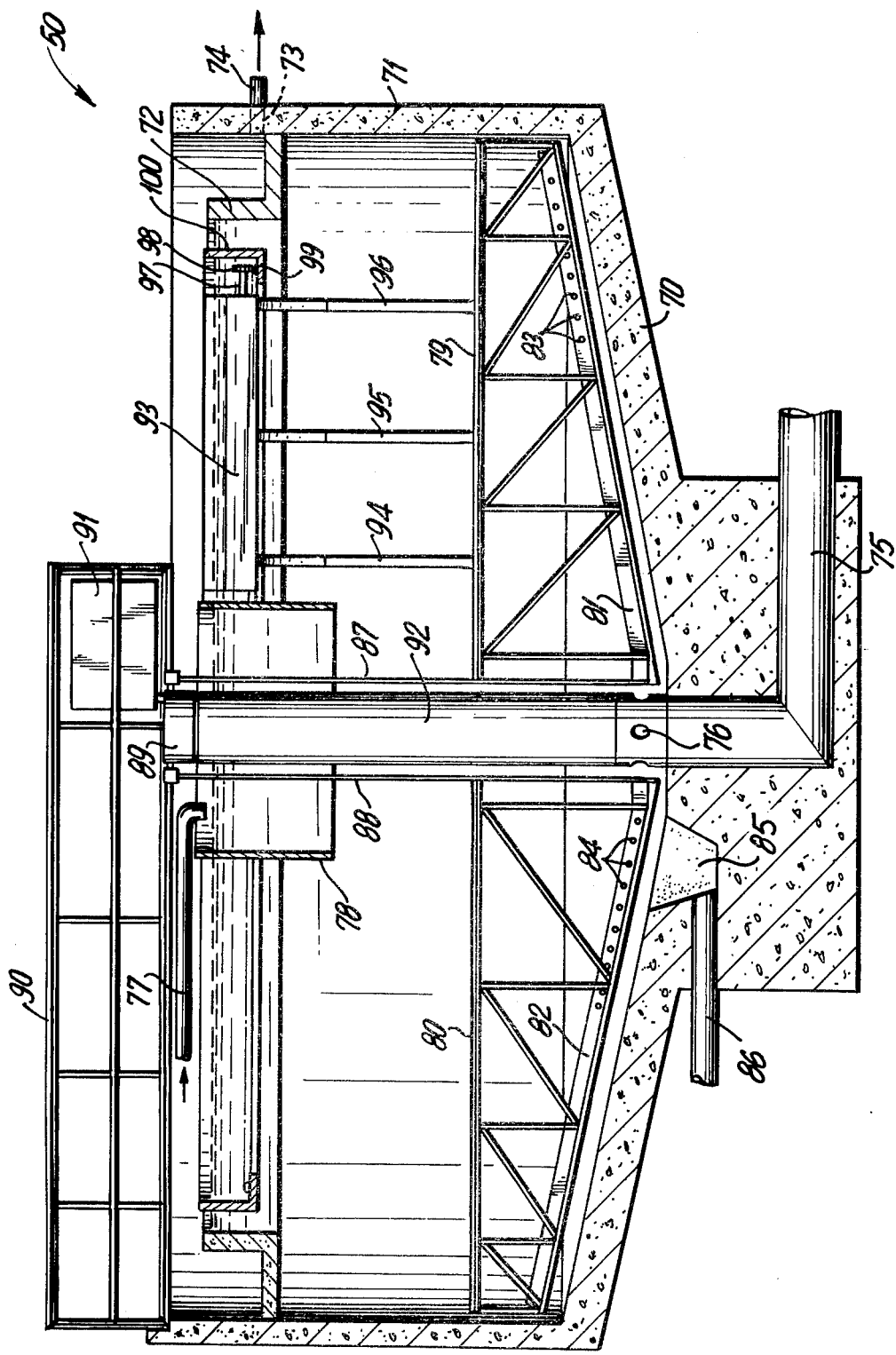
FIG. 2 is a sectional, elevational view of a liquid-solid settling chamber employing the apparatus of the present invention.

FIG. 2 shows a detailed sectional elevational view of the sludge settling chamber 50 such as employed in the FIG. 1 system, utilizing the floating solids degassing apparatus of the present invention. In the FIG. 2 system, sludge to be separated is introduced to the open-topped sludge settling chamber 50 in conduit 77, which discharges feed sludge into a sludge receiving well defined by the circular baffle 78. In the stripping chamber, the so-introduced sludge settles and is contacted with upflowing low phosphate, low solids stripping medium introduced into the settling chamber 50 in line 75, while terminates in a lower portion of the settling chamber and discharges low phosphate, low solids stripping medium through the outlet openings 76. Solids-depleted liquid is withdrawn from an upper section of the chamber via overflow weir 72, which communicates with outlet conduit 74 through aperture 73 in the settling chamber wall 71.

As shown, the settling chamber 50 has a sloping bottom defined by floor member 70. Sludge solids settling in the lower section of the chamber are collected by scraper blades 81, 82, which in turn are mounted on the bridge sections 79 and 80. Bridge sections 79 and 80 are suspended from the bridge super-structure 90 by cables 87 and 88. The bridge assembly is rotated around the circular extent of the chamber by drive means 91 mounted on the bridge super-structure 90. The drive means 91 are coupled to the upper section 89 of central column member 92 for rotation of the bridge and associated assemblies. The bridge assemblies 79 and 80 respectively carry hollow scraper blades 81 and 82, which are in turn provided with liquid outlet openings 83 and 84. The purpose of such configura- is to allow introduction of low phosphate, low solids stripping medium from the aperture opening 76 of the introduction conduit 75 into the respective hollow scraper blades, with subsequent distribution of the stripping medium through the apertures 83, 84 in the respective sludge scraper blades. During rotation of the bridge assembly, the sludge scraper blades 81 and 82 effect collection of the settled sludge solids in the settling chamber 50 and direct the collected solids to the sludge trough 85, which communicates with sludge outlet conduit 86, from which collected settled solids may be returned to the aeration zone or other end use.

The bridge assembly 79 supports an open-topped trough enclosure 93 by means of the support struts 94, 95 and 96. The trough enclosure, described more fully hereinafter, contains means for agitating liquid containing floating sludge solids which is internally attached to the shaft member 97, which terminates in a sprocket member 98, with the latter engaging the track 99 mounted on support baffle 100.

Figure 3:
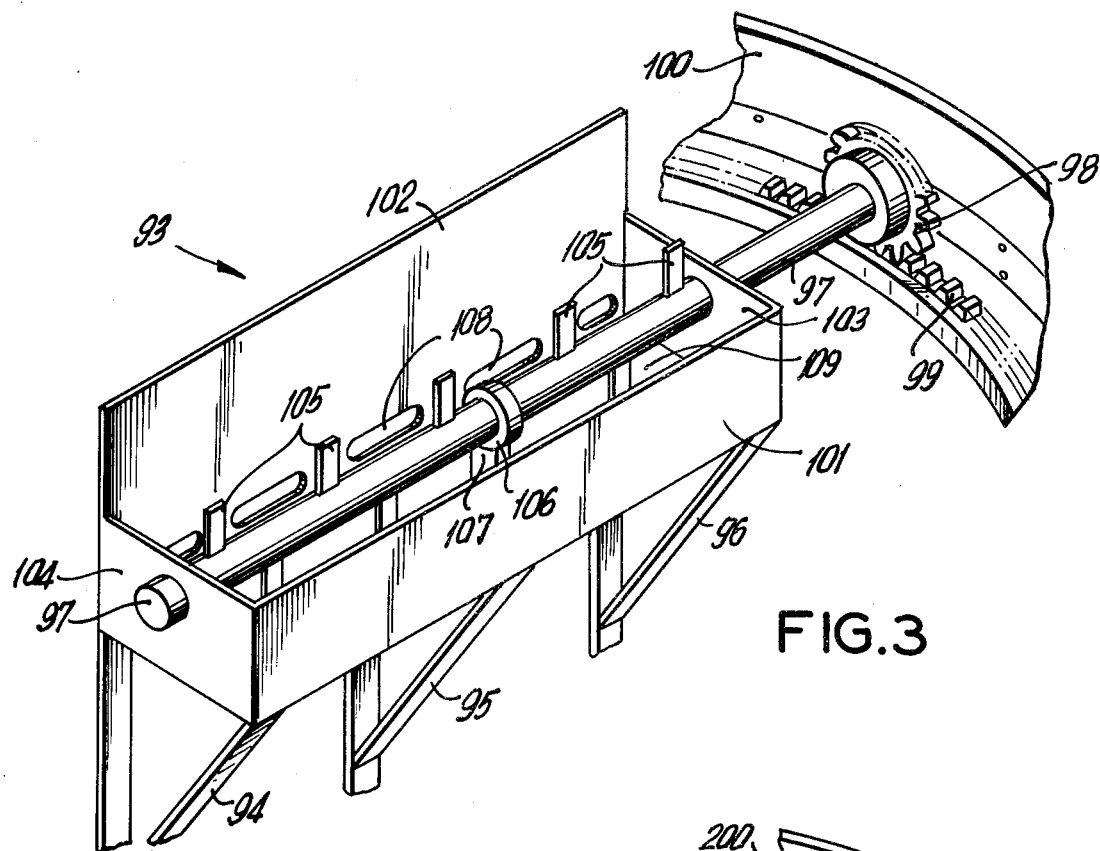
FIG. 3 is an isometric view of the floating solids degassing apparatus of the FIG. 2 system.

FIG. 3 shows an isometric view of the trough enclosure 93 employed in the FIG. 2 system. The trough enclosure has a first wall member 101 with a smaller vertical extent and a second wall member 102 substantially parallelly aligned with respect to the first wall member and spaced therefrom, with a greater vertical extent than the first wall member. Joined to the respective ends of the first and second wall members are side walls 103 and 104 of the trough enclosure. The trough enclosure is partially submerged in the liquid in the sludge settling chamber, as shown in FIG. 2, with the upper end of the first wall member below the surface of liquid in the sludge settling chamber and the upper end of the second wall member above the surface of liquid in the sludge settling chamber, whereby liquid containing floating sludge solids is flowed into the trough enclosure over the first wall member thereof. As previously described, mechanical means are disposed in the trough enclosure for gently agitating the liquid containing floating sludge for degassing of same to form liquid containing degassed sludge solids. In this embodiment, the mechanical means for gently agitating the liquid containing floating sludge solids in the trough enclosure comprise rotatable shaft 97 mounted in the trough enclosure with its longitudinal axis parallel to the first and second wall members of the trough enclosure, a plurality of radially extending blade means 105 joined to the shaft along the length thereof, and means for rotating the shaft whereby the blade means gently agitate the liquid containing floating sludge solids in the trough enclosure. The means for rotating the shaft include the previously described sprocket member 98 which engages a track 99 on the support baffle structure 100. In this arrangement, rotation of the bridge assembly of the FIG. 2 system effects rotation of the shaft 97. For preferred operation, in order to avoid shearing of the fine sludge solids floc particles, the means for rotating the shaft provide a blade means tip speed of less than 3 ft./sec. The apparatus shown in FIG. 3 also includes means for discharging liquid containing degassed sludge solids from the trough enclosure into the sludge settling chamber, comprising wall passage openings 108 in the second wall member 102 of the trough enclosure. As shown, shaft 97 includes a collar 106 which resides on bearing strut 107. Preferably, the direction of rotation of shaft 97 is such as to induce flow of liquid containing floating sludge into the trough enclosure over the first wall member thereof.

In the FIG. 3 embodiment, the sprocket assembly 98 provides means for translating the partially submerged trough enclosure across the liquid surface in the sludge settling chamber, concurrently with rotation of the bridge. In this arrangement, the trough enclosure translating means are motively coupled to the means for agitating the liquid containing floating sludge solids in the trough enclosure.

Referring again to FIG. 2, the means for withdrawing solids-depleted liquid from an upper section of the sludge settling chamber 50 comprise an overflow weir 72 having a wall member whose upper end defines the surface of liquid in the sludge settling chamber. In such type of system, the elevation of the upper end of the trough enclosure first wall member is preferably between 1 and 6 inches below the elevation of the upper end of the overflow weir member and the elevation of the upper end of the trough enclosure second wall member is above the elevation of the upper end of the overflow weir wall member. Preferably, the horizontal cross-sectional area of the trough enclosure is not greater than 20% of the horizontal cross-sectional area of the sludge settling chamber. Such limit insures that adequate liquid surface area is provided for efficient liquid-solids separation.

Figure 4:
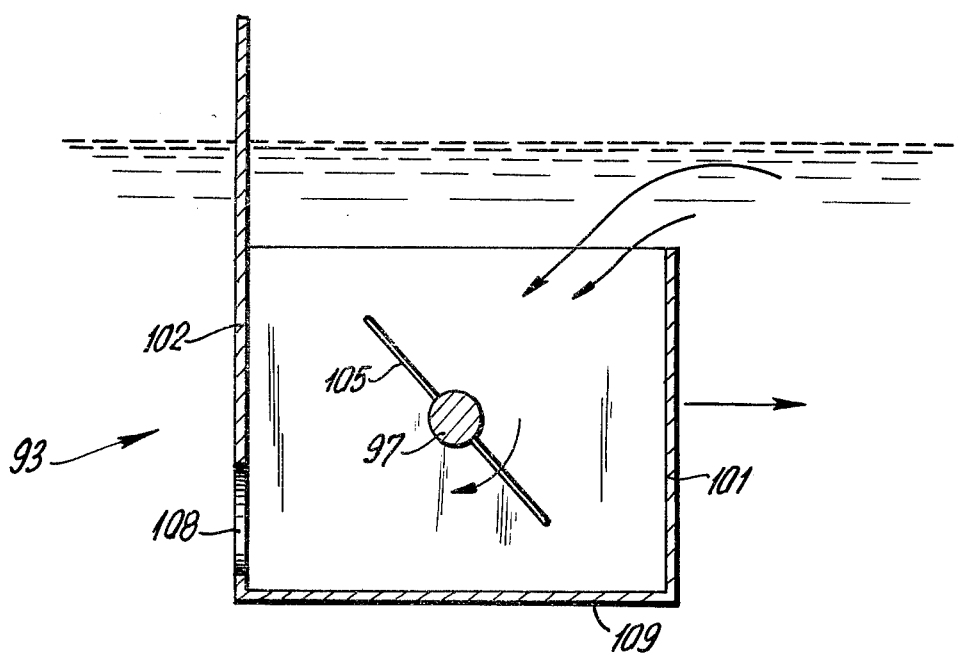
FIG. 4 is sectional, elevational view in cross section of the floating solids degassing apparatus of the FIG. 3 system.

FIG. 4 is a sectional, cross sectional elevational view of the trough enclosure of FIG. 3. As shown, the second wall member 102 is provided with a liquid outlet opening 108 therein. The first wall member 101, the second wall member 102 and floor member 109 together form a box-like enclosure for treatment of the liquid containing floating sludge. The shaft 97 and attached blade means 105 are rotated in a clockwise direction to induce flow of liquid containing floating sludge solids into the trough enclosure over the first wall member 101. The flow of liquid containing floating sludge solids into the trough enclosure is also enhanced by the direction of movement of the trough enclosure in the liquid being treated.

Figure 5:
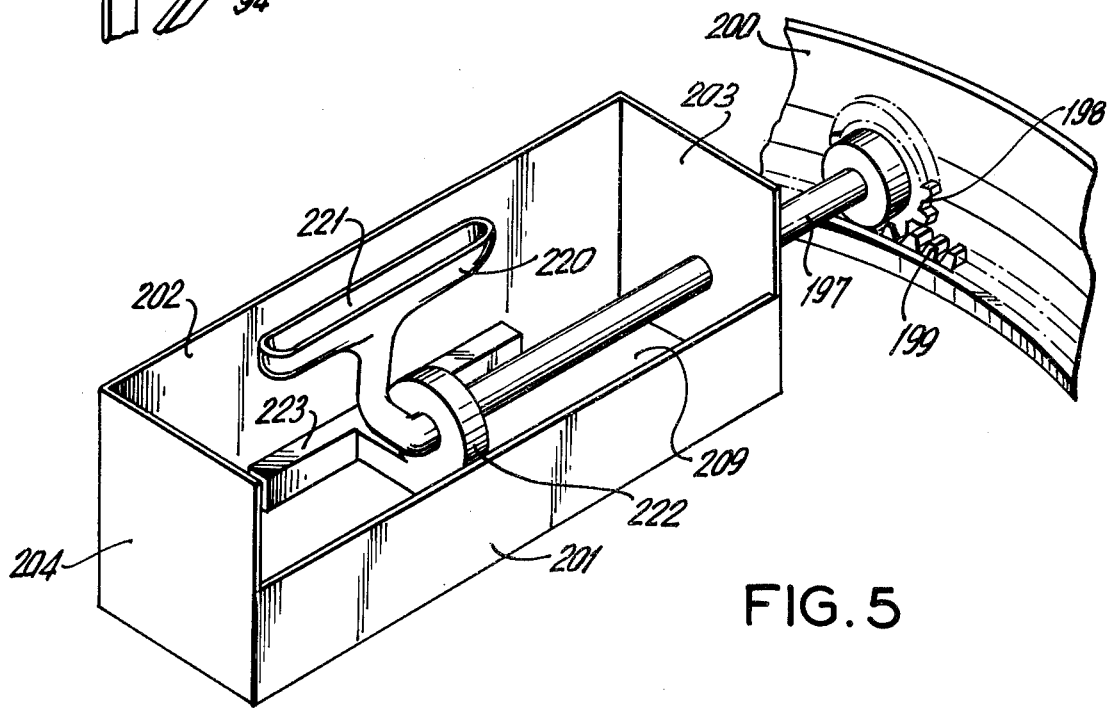
FIG. 5 is an isometric view of an alternaltive floating solids degassing apparatus according to the present invention.

FIG. 5 is a isometric view of a trough enclosure according to another embodiment of the invention. The trough enclosure is formed by first wall member 201, second wall member 202, side wall members 203 and 204, and floor member 209. The mechanical means for gently agitating the liquid containing floating solids in this embodiment comprise a centrifugal pump 222 joined with an intake funnel 220 and an exit manifold 223. The opening 221 to funnel 220 is submerged in the liquid being treated. The exit manifold 223 discharges liquid containing degassed solids through the second wall member 202, via openings in the second wall member 202. The centrifugal pump 222 is driven by rotatable shaft 197, which in turn is joined to the sprocket member 198 riding in the chain track 199 mounted on the baffle member 200. Such arrangement allows the FIG. 5 trough enclosure embodiment to be employed in a liquid-solid settling chamber in the same manner as shown in FIG. 2 herein.

Figure 6:
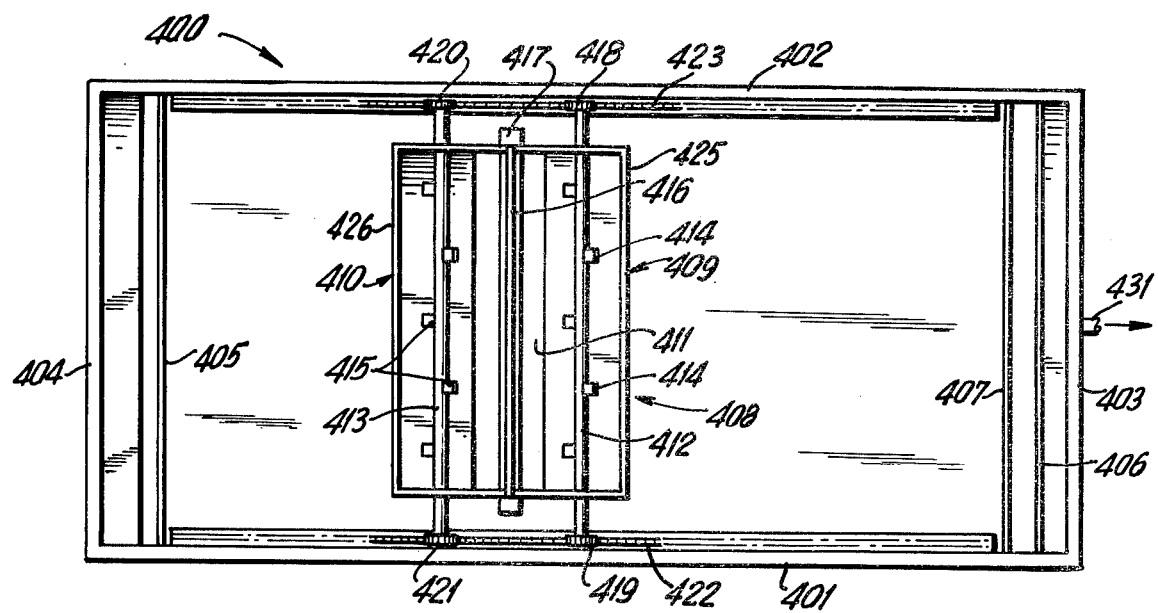
FIG. 6 is a plan view of a rectangular liquid-solid settling chamber employing the means of the present invention.

FIG. 6 is a plan view of a rectangular liquid-solid settling chamber employing the floating solids degassing apparatus of the invention. The settling chamber comprises side walls 401 and 402 and end walls 403 and 404. The chamber contains a liquid-solid feed well wall member 405, liquid effluent weir 406 and stilling baffle member 407. The trough assembly 408 comprises two trough enclosures 409 and 410. These trough enclosures have a common second wall member 416. The mechanical means for gently agitating the liquid containing floating solids in the trough enclosures comprise shafts 412 and 413 with blade means 414 and 415 mounted thereon, respectively. Shaft 412 is joined to sprocket members 418 and 419 at its extremities, with the sprocket members respectively engaging tracks 422 and 423. In like manner, shaft 413 terminates in sprocket members 420 and 421 which engage the respective tracks. Each of the trough enclosures has a bottom floor member which terminates short of the second wall member 416, thereby providing liquid outlet opening 411 for discharging liquid containing degassed solids from the trough enclosure into the liquid-solid settling chamber. The trough enclosure assembly is mounted on bridge support member 417.

Figure 7:
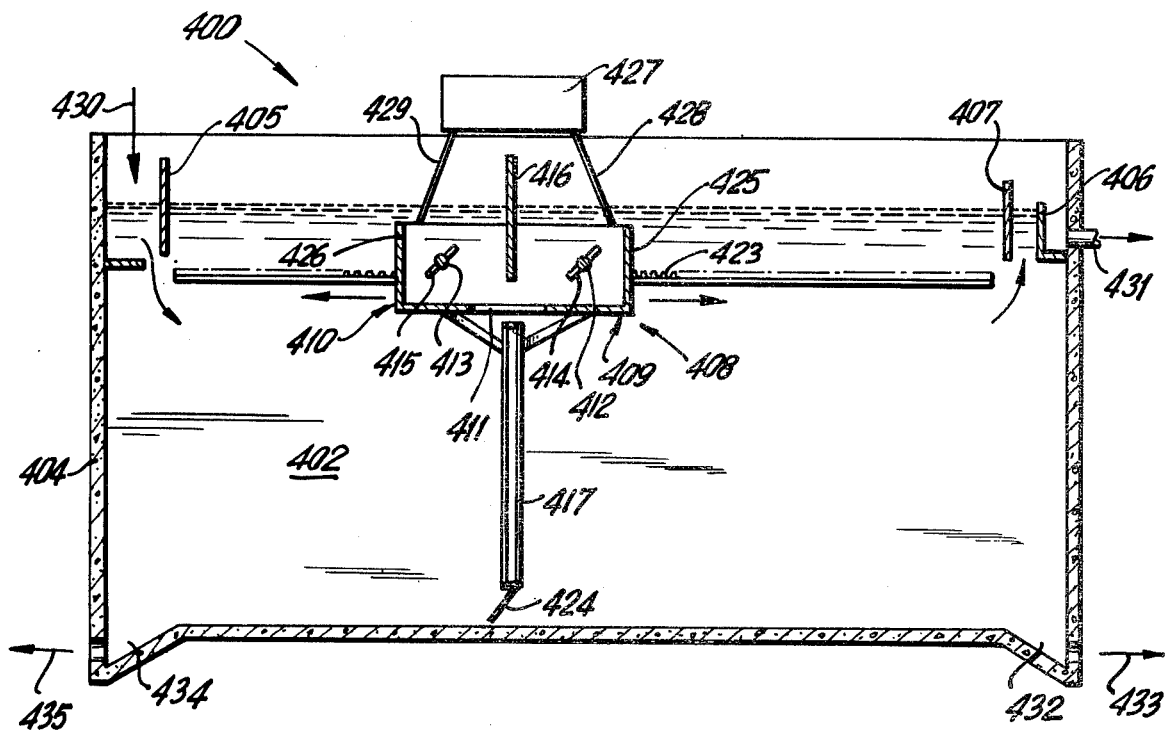
FIG. 7 is a sectional, elevational view of the liquid-solid settling chamber of FIG. 6.

FIG. 7 is a sectional, elevational view of the rectangular liquid-solid settling chamber of FIG. 6. As shown, the trough assembly is suspended by cable means 428 and 429 from a bridge assembly 427. The bridge assembly 427 (not shown in FIG. 6 for clarity) is driven by motor drive means (not shown) along a longitudinal path from one end of the basin to the other. By means of the construction shown, the trough enclosure assembly is active in both directions of movement. As the trough enclosure assembly moves from left to right across the settling chamber, liquid containing floating solids enters the right-hand trough enclosure 409, flowing over the first wall member 425. When the direction of movement is reversed, with the trough enclosure assembly moving from right to left, liquid containing floating solids flows into the left-hand trough enclosure 410 over the first wall member 426 thereof. As previously described, liquid containing degassed solids is discharged from the trough enclosure through the bottom opening 411 thereof.

In operation, liquid-solid to be separated is introduced to the chamber in line 430 and passes under the feed well baffle 405 into the settling chamber. Liquid-solid separation occurs in the chamber, with solids-depleted liquid being withdrawn from effluent weir 406 in line 431. Solids settling to the bottom of the settling chamber are collected by solids scraper blade 424, which is suspended from bridge support member 417. The collected solids are deposited by the scraper blade in solids trough 432 or 434, depending upon the direction of movement of the bridge, and collected solids are withdrawn from the system in either conduit 433 or 435.

Figure 8:
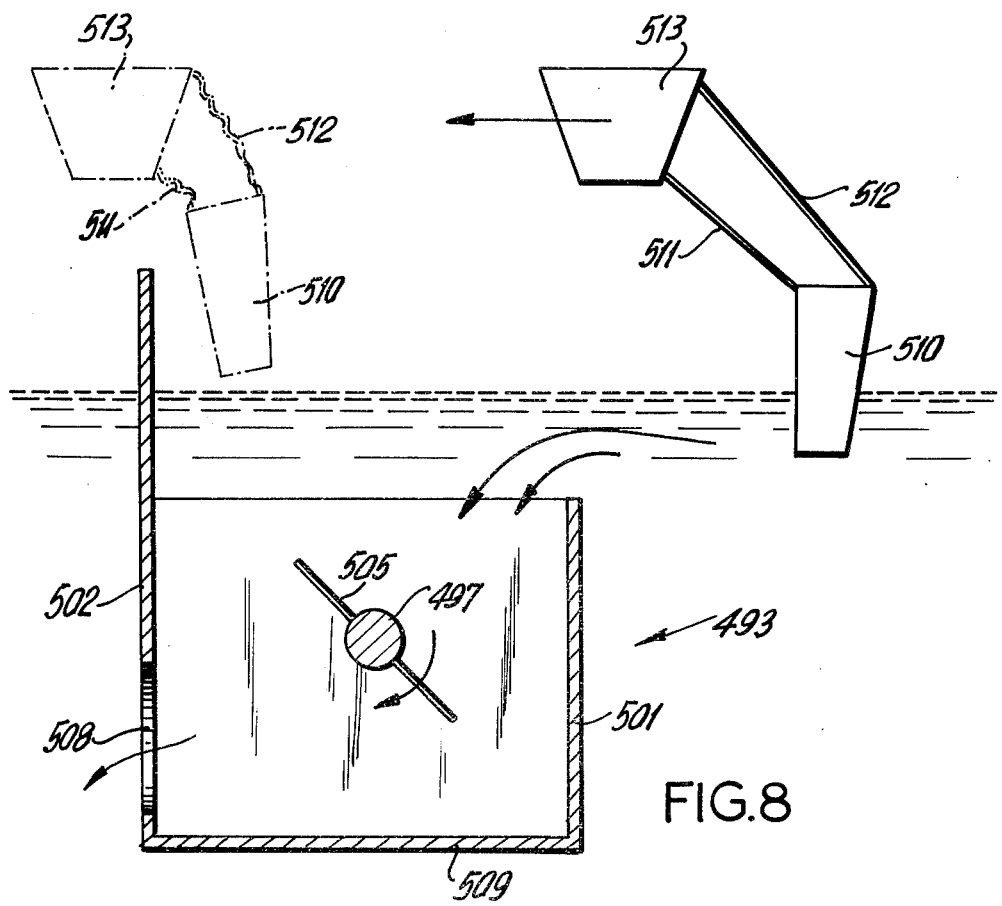
FIG. 8 is a sectional, elevational view in cross section of an alternative embodiment of the present invention.

FIG. 8 shows a cross-sectional, elevational view of floating solids degassing apparatus according to another embodiment of the invention. The trough enclosure is formed by first wall member 501, second wall member 502, and floor member 509. In the trough enclosure 493, mechanical means are provided for gently agitating liquid containing floating solids, comprising shaft member 497 with blade means 505 attached thereto. In this embodiment, the trough enclosure 493 is stationarily positioned in the liquid-solid settling chamber. A bridge assembly 513 is provided which has connected thereto a floating solids skimmer blade 510, connected to the bridge by cable means 511 and 512. The bridge is arranged to move in the direction shown such that the skimmer blade 510 traverses the liquid surface in the liquid-solid settling chamber, collects floating solids from the liquid surface and directs same into the trough enclosure. When the bridge 513 has completed its traverse at the second wall member 502 of the trough enclosure, the skimmer blade 510 is lifted from the liquid surface and moved back to a starting point, from which floating solids collection is re-initiated. In this manner, floating solids are directed by the skimmer blade 510 into the trough enclosure 493, gently agitated by blade means 505 on shaft 497 and discharged from the trough enclosure through wall opening 508 in the second wall member 502 of the trough enclosure.

Although preferred embodiments have been described in detail, it will be appreciated that other embodiments are contemplated only with modifications of the disclosed features, as being within the scope of the invention.

What is claimed is:

1. Apparatus for degassing floating solids containing entrapped gas in an open-topped liquid-solid settling chamber wherein said floating solids tend to accumulate at the surface of liquid being separated from solids, said solid-liquid settling chamber including means for introducing liquid-solid to be separated to said chamber, means for withdrawing solids-depleted liquid from an upper section of said chamber and means for withdrawing settled solids from a lower section of said chamber, said apparatus comprising: an open-topped trough enclosure positioned such that said trough enclosure is partially submerged in the liquid in said liquid-solid settling chamber, having a first wall member terminating at an upper end below the surface of liquid in said liquid-solid settling chamber and a second wall member substantially parallelly aligned with respect to the first wall member and spaced therefrom, terminating at an upper end above the surface of liquid in said liquid-solid settling chamber, whereby liquid containing floating solids is flowed into said trough enclosure over said first wall member thereof; a rotatable shaft mounted in said trough enclosure with its longitudinal axis generally horizontally oriented and parallel to said first and second wall members of said trough enclosure; a plurality of radially extending, non-helical blades joined to said shaft along the length thereof; means for rotating said shaft whereby said blades gently agitate said liquid containing floating solids in said trough enclosure for degassing of same, to form liquid containing degassed solids; and means for discharging said liquid containing degassed solids from said trough enclosure into said liquid-solid settling chamber.

2. Apparatus according to claim 1 wherein the horizontal cross-sectional area of said trough enclosure is not greater than 20% of the horizontal cross-sectional area of said liquid-solid settling chamber.

3. Apparatus according to claim 1 wherein wall passage openings are provided in said second wall member of said trough enclosure as the sole liquid outlet for discharging said liquid containing degassed solids from said trough enclosure into said liquid-solid settling chamber.

4. Apparatus according to claim 1 wherein said means for withdrawing solids-depleted liquid from an upper section of said liquid-solid settling chamber comprise an overflow weir having a wall member whose upper end defines the surface of liquid in said liquid-solid settling chamber and wherein the elevation of said upper end of said trough enclosure first wall member is between 1 and 6 inches below the elevation of said upper end of said overflow weir wall member and the elevation of said upper end of said trough enclosure second wall member is above the elevation of said upper end of said overflow weir wall member.

5. Apparatus according to claim 1 comprising means for translating said partially submerged trough enclosure across the liquid surface in said liquid-solid settling chamber.

6. Apparatus according to claim 5 wherein said trough enclosure translating means are motively coupled to said means for gently agitating said liquid containing floating solids in said trough enclosure.

7. Apparatus according to claim 1 wherein said trough enclosure is stationarily positioned in said liquid-solid settling chamber, further comprising skimmer means arranged to traverse the liquid surface in said sludge settling chamber, collect floating solids from said liquid surface and direct same into said trough enclosure.

8. Apparatus according to claim 1 wherein said trough enclosure has a bottom opening as the sole liquid outlet for discharging said liquid containing degassed solids from said trough enclosure.

9. Apparatus for degassing floating solids containing entrapped gas in an open-topped liquid-solid settling chamber wherein said floating solids tend to accumulate at the surface of liquid being separated from solids, said liquid-solid settling chamber including means for introducing liquid-solid to be separated to said chamber, means for withdrawing solids-depleted liquid from an upper section of said chamber and means for withdrawing settled solids from a lower section of said chamber, said apparatus comprising: an open-topped trough enclosure positioned such that said trough enclosure is partially submerged in the liquid in said liquid-solid settling chamber, having a first wall member terminating at an upper end below the surface of liquid in said liquid-solid settling chamber and a second wall member substantially parallelly aligned with respect to the first wall member and spaced therefrom, terminating at an upper end above the surface of liquid in said liquid-solid settling chamber, whereby liquid containing floating solids is flowed into said trough enclosure over said first wall member thereof; a rotatable shaft mounted in said trough enclosure with its longitudinal axis parallel to said first and second wall members of said trough enclosure; a plurality of radially extending blades joined to said shaft along the length thereof, said blades being axially spaced apart from one another such that each blade does not axially overlap any other blades on said shaft; means for rotating said shaft whereby said blades gently agitate said liquid containing floating solids in said trough enclosure for degassing of same, to form liquid containing degassed solids; and means for discharging said liquid containing degassed solids from said trough enclosure into said liquid-solid settling chamber.

10. Apparatus according to claim 9 wherein the direction of rotation of said shaft is such as to induce flow of liquid containing floating solids into said trough enclosure over said first wall member thereof.

11. Apparatus according to claim 9 wherein said means for rotating said shaft provide a blade tip speed of less than 3 ft/sec.

* * * * *